(No Model.)

W. H. PAYNE.
GLOVE OR CORSET FASTENING DEVICE.

No. 540,801. Patented June 11, 1895.

Witnesses:
Jno. C. Parker
F. A. Fleischmann

Inventor:
William H. Payne,
by his Attorney,
Horace Pettit.

THE NORRIS PETERS CO., PHOTO-LITHO., WASHINGTON, D. C.

UNITED STATES PATENT OFFICE.

WILLIAM H. PAYNE, OF CAMDEN, NEW JERSEY, ASSIGNOR OF TWO-THIRDS TO WILBERT L. SWEETEN, OF SAME PLACE, AND FRANCIS T. O'SHAUGHNESSY, OF PHILADELPHIA, PENNSYLVANIA.

GLOVE OR CORSET FASTENING DEVICE.

SPECIFICATION forming part of Letters Patent No. 540,801, dated June 11, 1895.

Application filed September 13, 1894. Serial No. 522,882. (No model.)

*To all whom it may concern:*

Be it known that I, WILLIAM H. PAYNE, of the city of Camden, in the county of Camden and State of New Jersey, have invented a certain new and Improved Glove or Corset Fastening Device; and I do hereby declare the following to be a full, clear, and exact description thereof, reference being had to the accompanying drawings, forming part of this specification.

My invention relates to certain improvements in fastening devices for gloves, corsets and similar articles, and has for its object to provide a simple and cheap form of fastener which may be automatically closed, as more fully set forth hereinafter.

Figure 2:
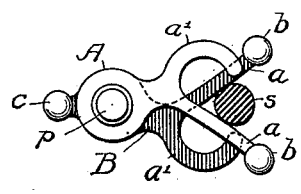
Figure 4:
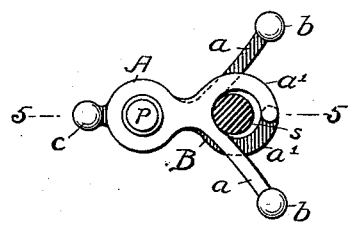
Figure 1:
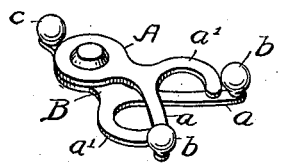
Figure 3:
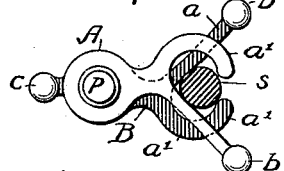
Figure 5:
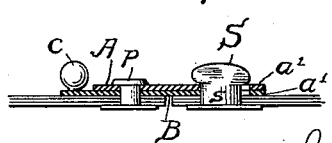

In the accompanying drawings, Figure 1 is a perspective view of a fastening device, constructed in accordance with my invention, showing the fastener fully opened. Fig. 2 is a plan view of the same, also showing the fastener in the open position. Figs. 3 and 4 are similar views showing, respectively, the fastener in a partially-closed and fully-closed position, and Fig. 5 is a longitudinal sectional elevation of the fastener on the line 5 5, Fig. 4.

The fastener is made in two pieces, A, B, mounted one above the other and secured together by a pivot pin, $p$, which also serves to secure the fastener to the glove or corset. Each section of the fastener is provided with a slightly curved or inclined arm, $a$, terminating in a button or knob, $b$, for convenience in opening the fastener and each has a curved arm, $a'$, which is in the form of a semicircle and when the fastener is completely closed as shown in Fig. 4 the extreme ends of these arms, $a'$, overlap and form an inclosing jaw which will encircle the shank, $s$, of a button or knob, S, secured to the edge of the glove, or the busk of the corset, as the case may be. As the two sections have precisely the same contour, the arms, $a$, will, when the fastener is open, as shown in Figs. 1 and 2, cross each other and when pressed into contact with the shank, $s$, the arms, $a$, will be gradually forced apart as shown in Figs. 3 and 4. As the shank is moved toward the pivot point, $p$, the semi-circular arms, $a'$, are by this action moved toward each other and gradually inclose the shank, $s$, so that by the time the shank reaches the position shown in Fig. 4 it will be completely encircled by the arms, $a'$, and the two parts of the glove or corset will be held together.

In opening the fastening, the arms, $a$, are forced toward each other by pressing together the buttons or knobs, $b$, when the arms, $a'$, will be gradually opened and the inclined or curved faces of the arms, $a$, will in crossing each other, force the shank out of the path of travel of the arms, $a'$.

For convenience in operation the lower section, B, is provided with a button or knob, $c$, so that the operator by grasping the button or knob, S, may draw the two together and effect the closing and locking of the fastener.

Having thus described my invention, what I claim, and desire to secure by Letters Patent, is—

1. An automatic fastening device comprising two similarly shaped pivoted sections, A, B, each section having a curved arm, $a'$, and an inclined arm, $a$, said sections being so pivoted together that the arms, $a$, will cross each other when the fastener is open, in combination with a stud to be locked, said stud when forced into contact with the inclined arms being adapted to force said arms apart and to effect the closure of the curved arms, $a'$.

2. An automatic fastening device comprising a stud, and two similarly shaped pivoted sections, A, B, each section having a curved arm, $a'$, and an inclined arm, $a$, said sections being so pivoted together that the inclined arms will cross when moved toward each other and so form an angular space of gradually decreasing area, the inclined arms acting upon the shank of the stud and forcing the latter out of the path of the opening curved arms, when the fastening is being unlocked, substantially as specified.

3. An automatic fastening device comprising two similarly shaped sections, A, B, each section having a curved arm, $a'$, and an inclined arm, $a$, said sections being mounted one above the other with their respective arms facing in opposite directions, a pivot pin, $p$, connecting the sections to each other and to the edge of the article or garment to be fastened, operating knobs, $b$, provided upon the outer ends of the arms, $a'$, an operating knob, $c$, secured to one of the sections of the fastener at a point to the rear of the pivot pin, $p$, and a button or stud to be engaged by the fastening device secured to the opposite edge or piece of the said article or garment.

In witness whereof I have hereunto set my hand this 8th day of September, A. D. 1894.

WILLIAM H. PAYNE.

Witnesses:
F. T. O'SHAUGHNESSY,
JNO. E. PARKER.